Patented Aug. 12, 1930

1,772,647

UNITED STATES PATENT OFFICE

MERWYN C. TEAGUE, OF JACKSON HEIGHTS, NEW YORK, ASSIGNOR TO AMERICAN RUBBER COMPANY, OF EAST CAMBRIDGE, MASSACHUSETTS, A CORPORATION OF MASSACHUSETTS

METHOD OF THICKENING AND STABILIZING LATEX AND PRODUCT

No Drawing. Original application filed June 9, 1924, Serial No. 719,015. Divided and this application filed December 7, 1927. Serial No. 238,461.

This invention relates to a method of thickening and stabilizing latex and to the product thereof, more particularly for use in coating and extruding.

In the making of rubberized articles by a coating operation, such as by spreading or dipping, it has been common for many years to use a solution of broken-down or milled rubber in a volatile solvent to form the doughs and cements which are applied to the material to be rubberized to form a coating thereon. For extruding purposes it has been necessary to use milled rubber which has been softened sufficiently by heat and compounding to possess the desired fluidity and plasticity.

Owing to the fact that the rubber compounds used for coating must be varied to some extent in accordance with the particular purpose for which they are designed, and also owing to the fact that the compounds must be differently colored for different purposes, it is necessary to make up a considerable number of different batches in the factory. As such compounds can be most economically made up in large quantities and it is desirable to have a stock of each compound used always on hand for convenience and speed in manufacture, it has been customary to mix up such cements and doughs in large batches.

Recently there has been considerable development in the use of rubber latex as such for coating by spreading and dipping. However, as is well known, latex consists of a sensitive and easily coagulated dispersion of the rubber particles in an aqueous continuous phase, and, owing to its fluidity, it is unsuitable in its natural condition for certain coating purposes such as where it is desired to prevent impregnation of the material being coated. In addition, by reason of its fluidity it cannot be successfully used with the present types of spreader machines operating with a relatively viscous and thick dough of broken-down or milled rubber, nor can it be used for extruding purposes where a thick, plastic compound is required. By compounding the latex with certain inert fillers it is possible to obtain it in a sufficiently thickened condition to use for some coating operations, but such thickened compounds become quite sensitive to rubbing or handling and will frequently coagulate before or during use. Certain chemicals also act to thicken the latex, but after standing a few hours they render it sensitive and easily coagulated. It has also been possible by the use of certain substances such as glue or gelatine to obtain the desired thickening as well as a certain amount of stability, but in order to obtain this result it has been necessary to add these substances in such an excessive amount that undesirable properties are imparted to the finished material, such as lack of flexibility and poor ageing properties. Hence, due to these characteristics of latex it has not been practically possible prior to my invention to produce a latex thickened sufficiently for spreading and extruding and which at the same time has sufficient stability to enable it to be made up in large batches and kept for a reasonable length of time or until used.

An object of my invention is to provide a process for both thickening and stabilizing latex without coagulation thereof.

Another object is to provide a process for thickening and stabilizing latex without substantial modification of its protein content.

Still another object is to provide a process for thickening and stabilizing latex without coagulation, by chemical action, physical action, or both.

A further object is to provide a thickened and stabilized uncoagulated latex without the addition thereto of substances undesirable in themselves or imparting undesirable properties to the finished product.

For a detailed disclosure of the nature and objects of the invention reference is had to the accompanying specification and claims.

The invention consists broadly in the addition to latex of a substance or substances capable of both stabilizing the latex and thickening it to any desired degree, without coagulation thereof and without imparting undesirable properties to the finished product. The invention also comprises the product obtained.

This application is a division of copending application Serial No. 718,015, filed June 9, 1924, in which is described the treatment of latex with various metallic compounds including litharge, lead thiosulphate, basic lead acetate, lead hydroxide, ferric oxide, ferrous lactate, basic ferric acetate, stannous oxalate, cadmium sulphide, and other materials.

According to the present invention it has been found that latex may be thickened and stabilized in the presence of suitable proportions of saponin, and the following is given as an example of the use of this stabilizing agent, using 60% concentrated latex.

```
100  parts rubber by weight (as 60% solids latex).
200  parts lithopone by weight.
  1  part saponin by weight.
0.5  part ultramarine blue by weight.
  1  part zinc oxide by weight.
  3  parts sulphur by weight.
0.5  part zinc dimethyl-dithiocarbamate.
```

The above compound may be cured in air in two hours at 212° F.

It is also possible to carry out the process using two of the previously mentioned agents for thickening and stabilizing the latex, and as an example with the use of normal latex the following is given:

```
100 parts rubber by weight (as normal latex of about 33% solids).
  1 part saponin by weight.
 15 parts lead acetate by weight.
 90 parts whiting by weight.
  3 parts sulphur by weight.
 30 parts light spindle oil by weight.
  2 parts glue by weight.
  3 parts of the condensation product of acetaldehyde and aniline prepared in acid solution.
```

The above compound may be cured in air with one-half hour rise to 260° F. and held at this temperature for one and one-half hours. In the above formula the saponin performs a double function since it not only acts directly as a stabilizing agent, but it also acts as a protective agent for the lead acetate, which latter in the absence of such an agent has a coagulative effect on the latex. If desired 15 parts of basic lead acetate may be substituted for the lead acetate in the above formula.

It will be seen by the use of my invention a thickened and stabilized latex can be produced by the addition thereto of one or more of the agents mentioned, which act upon the latex physically or chemically or both, to provide a latex suitable for such purposes as extruding, spreading or dipping, without the introduction of any materials which are injurious in themselves or impart injurious properties to the finished product. Moreover, when it is not desired to use a concentrated latex the normal latex may be used instead.

In all forms of the invention a thickening and stabilizing non-protein substance is added to the latex, and in the case of the chemically acting compounds the compound is decomposed subsequently to its addition and includes a basic substance. The chemically acting compound is decomposed by its action on the latex non-protein soluble constituents. In all forms of the invention a stabilized latex is obtained, and as before stated by varying the concentration of the latex, the quantity and kind of filler, the water, and the quantity and kind of stabilizing and thickening agent any desired degree of thickening may be obtained. Therefore by the use of my invention it is possible to make up latex compounds which will keep for considerable periods of time and the consistency of which may be varied as desired to adapt them for various purposes such as dipping, spreading, extruding, etc. My invention therefore greatly enlarges the field of use for rubber latex as such, and at the same time allows in many cases, such as the spreader machines previously mentioned, the use of the same apparatus as was formerly used with compounds prepared from milled rubber. As even a thick and viscous rubber cement contains a relatively small amount of rubber as compared with latex of very much less viscosity, it will be seen that by the use of the product of my method a relatively large quantity of rubber can when desired be applied as a coating in a single operation. Moreover the use of inflammable and expensive organic solvents is done away with, and the coating obtained from the latex is of superior strength and curing qualities and also is bonded with much greater tenacity to the fibrous or other material to which the coating is applied. Rubberized fabrics and similar materials coated with the product of my invention, or articles formed by extrusion, possess the advantages of great flexibility, good appearance, improved ageing qualities and low cost.

While specific examples of the invention have been given it is obvious that it is capable of modification and it is not desired to limit it to the particular examples given or to the specific agents described, otherwise than as defined in the appended claims.

Having thus described my invention, what I claim and desire to protect by Letters Patent is:

1. The process of treating latex which comprises thickening and stabilizing a compounded latex containing not less than substantially 60% solids by the addition thereto of saponin in excess of one-half part by weight per 100 parts of rubber.

2. The process of treating latex which comprises thickening and stabilizing the latex by the addition thereto of saponin in the proportion of not less than one half part by weight for every 100 parts by weight of rubber in the form of latex containing substantially 60% solids.

3. As a new article, an uncoagulated latex paste containing saponin in excess of one half part by weight for every 100 parts by weight of rubber in the form of latex containing substantially 60% solids.

4. As a new article, a substantially uncoagulated thickened and stabilized latex containing saponin in the proportion of not less than one half part by weight for every 100 parts by weight of rubber in the form of latex containing substantially 60% solids.

Signed at New York, county and State of New York, this 3rd day of December, 1927.

MERWYN C. TEAGUE.